Patented Dec. 25, 1951

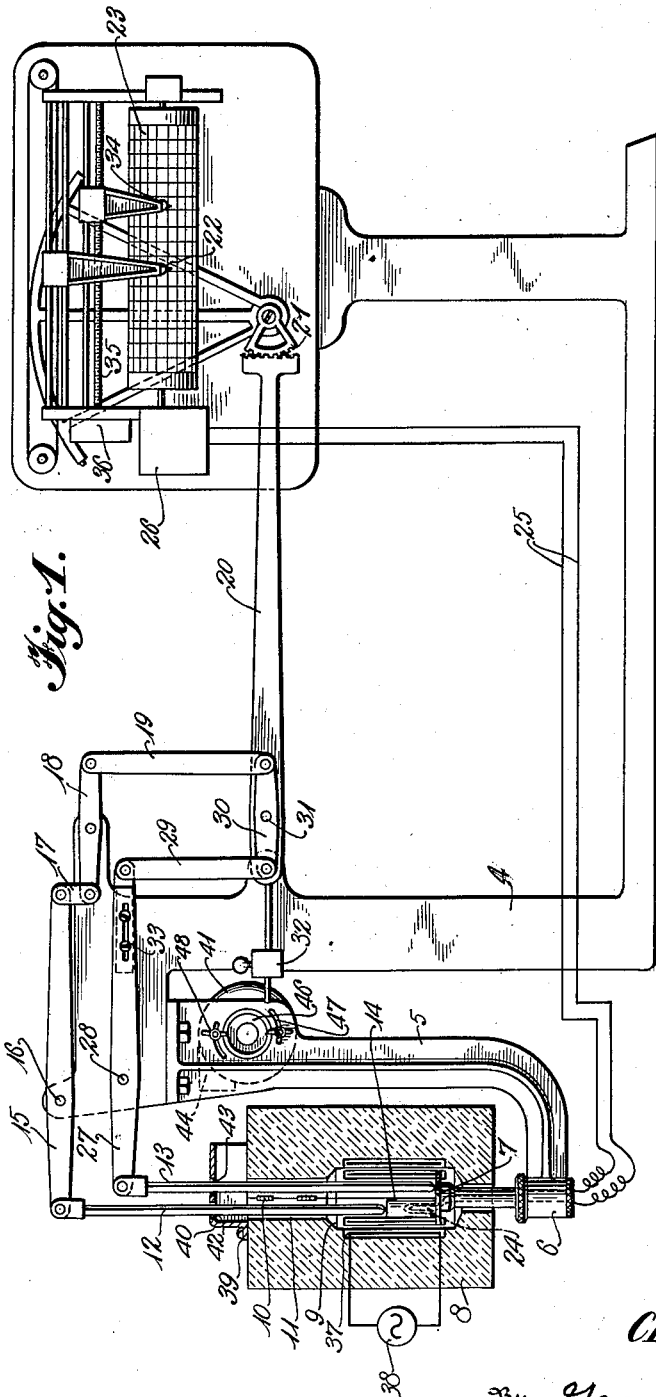

2,580,259

UNITED STATES PATENT OFFICE 2,580,259

TEMPERATURE EQUALIZING MEANS FOR FURNACES

Charles F. Wetherbee, Naugatuck, Conn., assignor to The Bristol Company, Waterbury, Conn., a corporation of Connecticut Application September 9, 1947, Serial No. 772,995

7 Claims. (Cl. 73—16)

This invention relates to temperature equalizing means for furnaces. More particularly, it relates to a means for eliminating errors in measurement caused by temperature gradients in furnaces used to heat specimens in dilatometers or devices for determining the expansion characteristics of solid specimens.

In the prior art, it is known to measure the expansion characteristics of a body of metal by placing it in a heated furnace, and then through linkage contacting the specimen, producing a graph on a recording chart from which the desired characteristics can be determined. One example of a mechanism which has been found highly advantageous for this purpose is that described and claimed in my Patent No. 2,380,565 issued July 31, 1945. For purposes of illustration, an instrument of the type shown in that patent has been shown with the distinct understanding, however, that the application of the invention is not confined to that particular structure but may be applied to other structures which exhibit the difficulies which the present invention is designed to overcome.

In devices of the character under consideration, it has usually been found to be expedient to measure the expansion characteristics of a specimen by using a specimen of cylindrical shape disposed on a pedestal within a heating chamber so that the longer dimension of the cylinder extends in an approximately vertical direction. The elongation of the specimen is measured by the variation in distance between the pedestal which has, as nearly as possible a zero temperature coefficient of expansion, and another member contacting the top end of the specimen, said member having expansion characteristics similar to those of the pedestal. Inasmuch as the specimen must be confined as much as possible within the heating chamber, in order to produce effective heating, and since the measuring means must contact the top of the specimen, it is necessary that the furnace have an opening in its wall, usually in the top. The source of heat is usually near the bottom of the chamber formed in the furnace, hence, there is a tendency for the convection currents flowing upward to produce a "chimney effect" which results in unequal temperatures at different points in the specimen, and this resulting temperature gradient introduces errors in the precise measurements which are often desired.

While the circulation of the heated air in the furnace may be minimized by sealing as completely as possible all openings between the interior of the furnace and the external atmosphere, such sealing must necessarily be incomplete. The microscopic displacements of the heated specimen, and the mechanical connections between the same and the exterior measuring mechanism in response to temperature changes, render impracticable the use of any form of seal involving physical contact and consequent friction between stationary and moving parts. At the same time, the variety of dimensions among individual test specimens, and the frequency with which the furnace must be opened and closed for changing specimens, requires that spacing between the body of the furnace and the delicate mechanical linkages be so great as to render substantially ineffective any attempt to restrict circulation of heated gases by reducing clearances to negligible dimensions.

The object of the present invention is, therefore, to provide a structure capable of eliminating these errors by neutralizing the convection currents while at the same time avoiding the imposition of any frictional effect on the linkage which passes through the wall of the chamber. In this way, the frictional errors which have been introduced by attempts to seal the linkage opening in the chamber wall are prevented and it is possible to so arrange the structure that the compensating means is effective not only to eliminate errors due to convection currents when the furnace is closed, but also to serve as an air-quenching means for the specimen when the furnace is removed.

Briefly stated, therefore, the invention consists in providing means for directing a stream of air into the opening in the chamber in a direction and at a pressure to exactly counter-balance the pressure caused by convection currents flowing or tending to flow through the opening. Preferably, the furnace around the opening carries a cowl or hood having an opening which faces the air current in order to concentrate the stream, but without imposing any friction upon the linkage which passes through the opening into contact with the specimen.

The invention will be more fully understood from a reading of the specification in connection with the accompanying drawings in which Fig. 1 is an elevation showing an embodiment of the present invention applied to a dilatometer of conventional form, the furnace chamber being shown in section in order to illustrate the relation of parts. Fig. 2 is an end elevation of the blower apparatus of Fig. 1 showing its relation to the mounting means.

Referring to the drawings, reference character 4 designates a supporting framework for the instrument, said framework having a depending goose-neck 5 terminating in an adjustable support 6 which carries a flat plate 7 arranged to be housed within a furnace chamber 9 formed within a refractory insulated body 8. The body 8 is preferably composed of two parts hinged together, as at 10, in order to permit removal of the furnace without disturbing the specimen on the support. The chamber has a top opening 11 through which pass two rods 12 and 13 forming parts of a linkage for transmitting the dimensional changes of the specimen to a recording mechanism associated with the instrument.

In practice, the pedestal and plate, as well as the rods 12 and 13, are preferably formed of quartz which has a low temperature coefficient of expansion, and therefore introduce a minimum error into the measurements. The lower ends of rods 12 and 13 are rounded, the former for contact with the top surface of a cylindrical specimen 14, and the latter for contact with the plate 7. It will be evident that with this arrangement any longitudinal expansion of the specimen 14 will result in a differential movement between the two rods 12 and 13. The upper end of rod 12 is pivotally connected to a horizontal lever member 15 which is pivoted to the frame 4 at 16 and acts through links 17, 18, 19 and compensating lever 30 to impart movement to a lever 20 connected through a rack and quadrant 21 to actuate a pen 22 associated with a rotatable chart 23 carried by an extension of the framework 4 and adapted to be driven in accordance with temperature changes in the specimen. These changes are imparted to a thermo-couple 24 housed within the specimen and connected through wires 25 with conventional actuating mechanism 26. The rod 13 is similarly connected to a horizontal lever 27 fulcrumed at 28 on the frame 4 and transmitting motion through link 29 to compensating lever 30 fulcrumed at 31 onto lever 20. The lever 20 has an adjustable counter-balance 32 for initially positioning the rods 12 and 13 when a specimen is to be tested. Associated with the horizontal lever 27 is a compensating means 33 provided to eliminate errors due to expansion of the various links by the heat emanating from the furnace. The details of operation of this linkage are fully set forth in my said patent, 2,380,565. While it is not essential to the present invention, there is shown on the chart 23 a second pen 34 which is driven through a lead screw 35 and a clock mechanism 36.

It will be apparent, from the description given above, that when the specimen 14 is placed within the chamber and changes its dimensions due to heating, this will result in movement of the linkage just described, and will produce relative movement between the pens 22 and 34 on chart 23 to inscribe a series of graphs on the chart. The furnace 8 may in practice have electric heating elements designated 37 embedded in its walls adjacent to the specimen and supplied with current from a suitable source 38.

The mechanism so far described is known in the prior art and no claim is made for its novelty. As indicated above, this structure may result in non-uniform heating of specimen 14, by convection currents, and hence in the presence of errors when precision measurements are desired. It is to overcome these difficulties that the invention now to be described is directed.

Attached to the top of the furnace chamber as at 39 is a hood 40 having a lateral opening facing the discharge 44 of a blower 41. The hood contains apertures 42 and 43 to accommodate the rods 12 and 13 respectively, and to avoid any frictional contact between the rods and the hood during movement of the linkage. The hood is so constructed that the furnace may be removed without disturbing the specimen, its support, or the linkage.

The blower 41, which may conveniently be of a type having a volute casing, is mounted on the upright portion of the goose-neck 5 with its discharge 44 directed towards the opening in the hood 40. The fan within the casing may be driven by an electric motor designated 45, and will receive its air from the lateral intake indicated 46 and discharge it in more or less tangential relation to the blower casing. The supporting portion of the goose-neck 5 contains arcuate slots 47 permitting rotational adjustments of blower 41 and permitting securing the blower in a fixed position by means of wing nuts 48. It will thus be apparent that the discharge 44 can be raised and lowered in order to direct the discharging stream of air into the hood 40 or to direct it onto the specimen 14 if the furnace 8 is removed. It is to be understood that the apparatus disclosed herein is capable of operation in the usual manner for liquid quenching of the specimen, wherein the furnace is removed and the receptacle for quenching liquid raised so as to submerge the goose-neck 5, together with the support and the specimen, until the desired cooling effect is obtained. Where slower air quenching is desired, the cooling effect of the stream of air from the blower 41 may be utilized without the use of a quenching bath.

While the adjustment slots provide for controlling the direction of the stream of air towards the specimen or the hood, it will be clear that the volume as well as the pressure of this air discharge may likewise be controlled by varying the speed of the drive motor 45. In general, the values are so well defined that the simple adjustment scheme will be adequate, without the provision of a variable speed motor, or a control for the same.

The operation of the invention will be understood without detailed explanation, and hence it is believed to be necessary only to state that when a specimen has been placed within the furnace chamber and heated to the desired value, the blower will be adjusted so that no upward flow of heated air from the chamber can result. When a proper balance has been obtained between the pressure due to convection currents and the pressure due to the stream of air from the blower, it will be known that graphs inscribed on the chart 23 accurately represent the changes in dimensional or other characteristics of the specimen during either heating or recalescence.

While the invention has been illustrated as applied to a dilatometer, its application is not limited to the precise structure shown but may be applied to other types of furnace, be they used in dilatometers or otherwise, where the convection problem arises and is capable of being overcome by the counterbalancing effect of a controllable stream of air. Having thus described my invention, what I claim is:

1. In an instrument for measuring the response of metallic specimens to changes in temperature, a furnace chamber having an open top, heating means in said chamber, movable means passing through said open top for sensing the dimensional changes of a specimen in said chamber, a hood over said top, said hood having a lateral opening, and blower means for directing a flow of air into said lateral opening in opposition to convection currents flowing therefrom.

2. In a dilatometer, recording means, a portable furnace chamber having a top opening, heating means for said chamber, a specimen support in said chamber, linkage means passing through the top of said chamber for connecting a test specimen therein with the recording means, a hood covering said top opening but permitting free movement of said linkage means, a blower mounted to direct a flow of air into said hood and downwardly into said chamber in opposition to upwardly flowing convection currents therein, and means for adjusting said blower to direct air into said chamber when said furnace surrounds the specimen or directly onto the specimen when the furnace is removed.

3. In a dilatometer, a heating chamber for test specimens, said heating chamber being provided with a wall opening, measuring means outside of said chamber, linkage connected to said measuring means passing through said wall opening and arranged to engage a specimen in said chamber, and convection current neutralizing means disposed outside of said heating chamber including a hood over said wall opening and a blower for directing a stream of air toward said hood to oppose and neutralize convection currents created by the heat in said heating chamber.

4. In an instrument for measuring the response of test specimens to changes in temperature, a heating chamber provided with a wall opening, movable means passing through the wall opening for sensing the dimensional changes of a specimen in said heating chamber and convection current neutralizing means for supplying a stream of air toward the wall opening to oppose and neutralize the convection currents created by the heat in said heating chamber.

5. In an instrument for measuring the response of test specimens to changes in temperature, a furnace chamber having an open top, heating means for said chamber, movable means passing through said open top for sensing the dimensional changes of a specimen in said chamber, and convection current neutralizing means for supplying a controllable stream of air downwardly toward said open top to oppose and neutralize the convection currents created by the heat in said chamber.

6. In a dilatometer, a furnace having a heating chamber for enclosing a test specimen, said chamber having an opening in one wall thereof through which convection currents may flow, a blower mounted to direct a stream of air toward said wall opening in opposing relation to the convection currents flowing therein, and means for adjusting said blower to control the direction of the stream of air toward said wall opening.

7. In a dilatometer, a support for test specimens, a furnace having a heating chamber for enclosing a test specimen on said support, said furnace comprising separable parts to permit removal of the furnace without disturbing the specimen on the support, said heating chamber being provided with a wall opening through which convection currents may flow, convection current neutralizing means for supplying a stream of air toward said wall opening in opposing relation to the convection currents flowing therein, and means for adjusting said convection current neutralizing means to control the direction of the stream of air toward said opening when the furnace surrounds the specimen and onto said specimen when the furnace is removed.

CHARLES F. WETHERBEE.

REFERENCES CITED

The following references are of record in the file of this patent:

UNITED STATES PATENTS

| Number | Name | Date |
| --- | --- | --- |
| 2,243,096 | Hardin | May 27, 1941 |
| 2,380,565 | Wetherbee | July 31, 1945 |
| 2,405,236 | Rhoades | Aug. 6, 1946 |